Patented Sept. 8, 1931

1,822,139

UNITED STATES PATENT OFFICE

FOREST J. FUNK, OF WILMINGTON, DELAWARE, ASSIGNOR, BY MESNE ASSIGNMENTS, TO THE EASTERN ALCOHOL CORPORATION, OF WILMINGTON, DELAWARE, A CORPORATION OF DELAWARE

BUTYL ALCOHOL AND ACETONE FERMENTATION PROCESS

No Drawing. Application filed October 1, 1920, Serial No. 414,087. Renewed March 26, 1925.

This invention relates to the production of butyl alcohol and acetone by fermentation of sugars, especially those occurring in molasses, and comprises a process of this kind in which the fermentation is brought about by a butyl alcohol-producing microorganism, and particularly by a bacteria which will be hereinafter designated Bacillus Aceto-butylicum.

Upon an investigation of the fermentation of molasses by Bacillus Aceto-butylicum it was found that, although satisfactory yields of butyl alcohol and acetone could be obtained when working on a small scale, large scale fermentations could not be carried out with uniformly successful results, the yield of butyl alcohol and acetone sometimes being satisfactory, but more often quite unsatisfactory. In all the fermentations in question corn gluten was used to supply the nitrogen required for bacterial metabolism.

After much work it was finally found that the trouble was in all probability due to a persistent contamination in the form of an organism remarkably resistant to heat. The failure to detect sooner this contaminating organism, which apparently is present in all molasses, was due to two main peculiarities: first, the fact that its activities are accompanied by no visible phenomena such as evolution of gas, and second, that it is so small as to be easily missed in a miscroscopic examination. The discovery of this contaminating organism served at first only to explain past failures, and for some time there was no sure way of overcoming the difficulties which it involved. This condition of affairs was due to the fact that the organism is remarkably resistant to heat, and that in order to kill it completely it was necessary to employ such a high temperature that the sugar in the molasses was sufficiently caramelized to make it unsatisfactory for use.

I have now devised a new seeding procedure by means of which I have been able to secure consistently good yields of butyl alcohol and acetone in large scale operations from mashes containing black strap molasses as the source of sugar, with or without corn gluten as an additional nitrogen source.

The essential points in this procedure consist, first, in developing the seed culture in such a manner as will result in the great majority of the butyl organisms being in the spore form at the time the seed is used to inoculate the mash; and, second, in inoculating the final mash at such a temperature—that temperature of pasteurization—that the remaining vegetative cells will be destroyed and the spores themselves so affected as to shorten their period of germination. In addition to the above two points, it has also been my practice in applying this procedure to take certain other steps which, I believe, greatly promote the successful progress of the fermentation. These are to sterilize the molasses for the final mash in 50% solution; to dilute the 50% molasses solution to the final working concentration of 6 to 10%, with water which has been sterilized by heating or by other suitable treatment, such as the application of ozonized air or ultra-violet light; or the concentrated molasses solution may be diluted with unsterilized water to the desired concentration of 6 to 10%, and then, if necessary, again sterilized by heating. With any of the foregoing procedures it is desirable that at the time the spore seed is to be added to the mash to be fermented, the latter should be at the temperature of pasteurization, in general, between temperatures of 135° and 170° F., (57.2° and 76.7° C.), and it has been found advantageous to maintain this temperature for a short period, not to exceed twenty-five minutes, though this holding at the temperature of pasteurization is not regarded as absolutely essential. At the end of this period of holding at the temperature of pasteurization, or immediately after adding the spore seed in cases where the holding process is not employed, the inoculated mash is cooled down as rapidly as possible to the fermentation temperature of about 98° F. (i. e. between 36–37° C.), at which temperature fermentation begins promptly and is complete in periods which have varied from 70 to 180 hours.

The species of bacteria which I prefer to use has been named Bacillus Aceto-butylicum; the manner of isolating this species of bacteria will be hereinafter described, but in order to facilitate their identification the species is described at this point in accordance with the descriptive chart of the Society of American Bacteriologists:—

Source—Corn meal from American maize.
Name—Bacillus Aceto-butylicum.

*I. Morphology*

1. Vegetable cells, motile:
   Media used—nutrient agar slant containing 1% corn starch, or 5% corn media (1 part corn meal in 20 parts water), temp. 32° C., age 24 hours.
   Form—short rods, chain formation.
   Size—2–4 microns x 1–2 microns.
   Ends—rounded.
   Stain—evenly with Loeffler's methylene blue or gentian violet.
   Gram stain positive.
2. Sporangia:
   Media used—nutrient agar slant containing 1% corn starch, temperature 32° C., after 2 days spores formed.
   Form—oval. Spores central.
   Limits of size—1.6 microns x 1.2 microns.
   Size of majority—1.6 microns x 1.2 microns.
   Spores strain poorly with Loeffler's methylene blue.

*II. Cultural features*

1. Nutrient agar slant media, age 24 hours, temp. 32° C.
   Growth—abundant.
   Form of growth—echinulate.
   Elevation of growth—raised.
   Luster—dull.
   Optical character—opaque.
   Topography—smooth.
   Odor—absent.
   Consistency—viscid.
   Media—clear.
2. Potato, 24 hours, 32° C.
   Growth—abundant.
   Form of growth—spreading.
   Elevation of growth—raised.
   Luster—dull.
   Topography—rugose.
   Odor—pleasant.
   Gas formation.
6. Nutrient broth.
   Surface growth—none.
   Clouding—moderate.
   Odor—none.
   Sediment—slight.
7. Milk.
   Coagulation prompt, with gas evolution.
   Clot digested.
8. Litmus milk.
   Acid, gas evolution, clot digestion.
10. Agar Colonies, 24 hours, 32° C.
    Growth—rapid.
    Round—becoming irregular.
    Surface—smooth.
    Elevation—raised.
    Edge—entire.
    Internal structure—amorphous.
11. Starch agar (1% corn starch in nutrient agar).
    Growth—abundant.
    Diastatic action—marked
17. Nitrogen source.
    Proteins, peptone.

*III. Physical and biochemical features*

1. Fermentation tubes.
   Substances fermented with gas evolution.
   Dextrose    +
   Saccharose  +
   Lactose     +
   Maltose     +
   Glycerine   —
   Starch      +
   Galactose   +
   Corn        +
   Dextrine    +
7. Optimum reaction of media:
   For growth and fermentation, Sorensen's pH values—5.0–6.3.
8. Vitality on culture media.
   Several months at 32° C.
9. Temperature relation.
   Optimum temperature 32° to 36° C.
   Spores resist 80° C. for 20 minutes.
10. Resistant to drying.
13. Acids produced, butyric.
15. Alcohol, butyl.
    Ketone, acetone.

*Isolation of the organism*

After a careful investigation of the subject, the procedure adopted for isolating the Bacillus Aceto-butylicum was as follows:—

Test tubes of corn meal solution are prepared, heated to 80° C. for about twenty minutes to kill the less resistant bacteria, incubated at 32° C. without removing the air, and then watched closely for evidence of butyl alcohol fermentation. The culture in the tube or tubes which shows an active fermentation in the presence of air and yields a characteristic butyl alcohol odor, are in part transferred to a solid agar culture plate and the bacteria allowed to develop in colonies on its surface. Transfers are made from these colonies to fresh sterilized corn meal tubes and the type noted which produced the characteristic fermentation. This operation is repeated several times until agar plates are obtained which contain only the colonies of the desired type. Transfers are made to sterilized potato slabs from colonies which developed from a single organism and the bacillus is then retained in pure culture on sterilized potato by frequent transfers.

Although the morphological and cultural characteristics listed above are believed to appertain to, and identify, a single organism, designated B. aceto-butylicum, and the carrying out of the above-described procedure is believed to isolate this B. acetobutylicum, it is, of course, possible that what has been supposed to be a single organism is a symbiotic combination of two organisms, or is a mixture of two different forms of modifications of the same organism.

By the term "culture", as used herein, I mean to include not only a single organism but a symbiotic combination of two organisms, or a mixture of two different forms or modifications of the same organism.

My invention may be illustrated by the following example:—One liter (or more) of a mash containing 5% by weight of corn meal, is sterilized in a culture vessel, which may be a laboratory flask, at fifteen pounds steam pressure for about three hours. This mash is cooled to the fermentation temperature of 98° F. (36.6° C.), and inoculated with an active culture of Bacillus Aceto-butylicum. This corn meal mash is held at a temperature of 98° F. (36.6° C.), for about two days, during which time active fermentation sets in, the gluten in the corn meal rises to the surface of the liquid, remains there during the height of the fermentation, (meanwhile undergoing considerable alteration in its physical properties, becoming slimy and full of entrained bubbles of gas evolved by the fermentation), after which it drops slowly to the bottom of the container; the period of active fermentation being over, the temperature is lowered to about 88° F., (31.1° C.), at which it is maintained for a further period of about five days, during which period, presumably owing to the exhaustion of the food materials and the presence of the products of fermentation, the vegetative cells of the organism which have produced the fermentation revert for the most part to the spore form, which is the condition in which they are used in my new procedure.

Shortly before this stage is reached a solution is prepared consisting of twenty-six pounds of molasses dissolved in about 3 gallons of water, to which is added about one and one-third pounds of commercial corn gluten containing about 44% of protein. This mixture is sterilized by heating at from fifteen to twenty-five pounds steam pressure for one-half hour, after which it is diluted to a final volume of forty gallons with water sterilized by heating, by ozone, or by ultraviolet light; or it may be diluted with unsterilized water to the final volume of forty gallons, and again immediately sterilized by heating with or without pressure for a further period of one-half hour or more.

If the dilution of the sterilized 50% molasses solution has been made with sterile cold water, the mash is heated at once and as rapidly as possible to a temperature of about 145° F., (62.8° C.); if the dilution has been made with hot water or the mash after dilution with cold water has been sterilized by further heating, it is cooled down to about 145° F., (62.8° C.). At this temperature the small corn meal mash containing butyl alcohol organisms, mainly in the spore form, is added to the molasses solution, and the whole either cooled immediately to about 98° F. (36.6° C.), or cooled after a period of standing at this higher temperature, which period has usually been about fifteen minutes in my experiments. The temperature suitable for fermentation may of course vary, but should ordinarily be between 30° and 40° C. (86°–104° F.), and preferably between 35° and 38° C.

Fermentation usually begins to be evident within five to seven hours are the addition of the spore seed, and progresses rapidly, complete fermentation having been secured in seventy-eight hours, though the time is more frequently between 90 and 120 hours. The yield of butyl alcohol plus acetone at the completion of fermentation is in the neighborhood of 30% of the weight of the sugar originally present in the mash.

The theoretic bases for this procedure are three-fold:

In the first place it has been found that commercial molasses (and probably other sources of sugar) contains a slightly motil bacterium which is extremely resistant to heat, so much so that any steam pressure treatment short of such a temperature as to caramelize the sugar and leave the molasses unfermentable, is insufficient completely to destroy this contamination. This organism produces non-volatile acid and is sufficiently active to inhabit the butyl fermentation if it gains the upper hand. It has very evidently been the cause of the failures and irregular results obtained prior to the adoption of the "pasteurized seed" procedure described above.

In the second place I have found that by sterilizing the molasses in 50% solution an appreciably greater number of the organisms forming this contamination are destroyed than when the molasses is diluted to the concentration in which it is usually used in the final mash, that is, 6 to 10%, before sterilization. Since the molasses contains about 50% of fermentable sugar, the sugar content of the mash which will ordinarliy be used is from 3 to 5%, or in other words, about 4%. It is important to carry out the various mashing operations with as little delay as possible and to manipulate the mash in such a way during the entire period of preparation between the initial sterilization and the final inoculation as to preclude the possibility of any substantial recovery and growth of any surviving harmful organisms of the type described above.

In the third place, the effect of the temperature of pasteurization upon the seed added is to destroy the remaining weakened vegetative cells and to act upon the spores in such a way that they germinate more readily than is the case with the unheated spores, which usually germinate rather slowly. The germinating spores produce the new vegetative cells in the medium which is to be fermented, and these cells are, therefore, better adapted to this medium than are those which have grown in a medium of some other constitution, as for example, corn meal mash. In this way I have found it possible to ferment mashes having concentrations up to 9% of molasses, i. e: 4½% of invert sugar with fairly uniform results, something which I was unable to accomplish before the use of this new procedure.

By adding a sufficiently large number of spores, which germinate rapidly to produce the vegetative cells which are the active agents in the fermentation, the effect of the residual contamination which survives the sterilization of the concentrated solution can be largely if not entirely overcome, so that this inhibiting influence is eliminated or becomes insignificant. The butyl organisms rapidly use up the sugar, leaving the acid-forming contamination nothing upon which to act.

It is, of course, essential that all bacteriologic precautions be taken to prevent the entrance of outside contamination at any stage of this process, and for this purpose all tanks, pipe lines, valves, and other fittings must be sterilized with flowing steam or with steam under pressure prior to use. It is also essential that the apparatus and connections be so designed that it will be impossible for any pocket or dead line to remain filled with incompletely sterilized mash or residues, as such form excellent breeding places for dangerous contaminating organisms.

It has been found advisable when using corn gluten as the additional source of nitrogen to sterilize this together with the molasses in the 50% solution.

My invention is not limited to the concentration of molasses given in the example, nor to the proportion of corn gluten given in this example, nor necessarily to its use at all, nor do I consider it essential that the seed used for inoculating the molasses mash should be grown in corn meal or other grain mash, as the results of my work indicate that a molasses mash may be used in this stage with equally good results. Furthermore, I do not wish to be limited to the temperature of 145° F. (62.8° C.) at which to add the spore seed to the mash, since I have successfully employed temperatures varying from 135° to 160° F. (57.2° to 71.2° C.). The period of holding at the pasteurization temperature may be varied somewhat in accordance with the size of the mash, and in the case of the larger mashes it may best be omitted altogether. It will also be understood that my invention is not limited to the use of a pasteurizing temperature only at the point of inoculating the final mash, since this procedure may be used to advantage in preparing the various seed stages prior to the final fermentation.

The sugar mashes may be made from practically any source of fermentable sugar such as corn sugar, cane sugar, sugar solution obtained by hydrolysis of wood cellulose, molasses, and others, my invention being particularly applicable to any fermentable sugar or starch solution contaminated by the organism above described.

The bacteria Bacillus Aceto-butylicum used in the above described process are facultative anaërobia, that is, their fermenting action is not materially influenced by a change in their environment with respect to oxygen. Consequently no effort need be made to insure the presence of air during the fermentation. The air is ordinarily excluded to a great extent by the evolution of gas from the fermenting mass, and of course air laden with bacteria is carefully excluded to prevent contamination. The advantage, however, in working with facultative anaërobes such as the Bacillus Aceto-butylicum is that it is frequently more convenient to avoid contamination by filtering the air than by excluding it entirely.

Although I prefer to use for the fermentation of carbohydrates pure strains of Bacillus Aceto-butylicum, my invention also includes the use of cultures obtainable from ordinary corn meal, and which remain active, and yield butyl alcohol and acetone, after being heated to 80° C. for about twenty minutes. The latter cultures, or cultures derived therefrom by a few transplantations, may give useful yields of butyl alcohol and acetone and yet may contain species of bacteria other than, and in addition to, the Bacillus Aceto-butylicum.

I do not limit myself to the fermentation of sugar solutions, such as molasses, by my new process, as it is equally useful in the fermentation of mashes containing higher polysaccharides, such as starch and dextrine, for example, cereal and potato mashes.

I claim :—

1. The process which comprises adding to a sterilized sugar mash a culture of bacteria which are derivable from ordinary corn meal, are sufficiently heat resistant to withstand a temperature of 80° C. for about twenty minutes, and are capable of producing butyl alcohol and acetone by fermentation, in the presence of air, of a sterilized corn meal solution, said addition being made with the bacteria mainly in the spore form and while the sterilized sugar mash is at a temperature of from about 57 to 77° C., and then cooling the inoculated mash to a temperature between 30 and 40° C. to bring about active fermentation thereof.

2. The process which comprises adding to a sterilized sugar mash, containing a vegetable protein readily assimilated by the bacteria which are to act as the fermenting agents, a culture of said bacteria which are derivable from ordinary corn meal, are sufficiently heat resistant to withstand a temperature of 80° C. for about twenty minutes, and are capable of producing butyl alcohol and acetone by fermentation, in the presence of air, of a sterilized corn meal solution, said addition being made with the bacteria mainly in the spore form and while the sterilized sugar mash is at a temperature of from about 57 to 77° C., and then cooling the inoculated mash to a temperature between 30 and 40° C. to bring about active fermentation thereof.

3. The process which comprises adding to a sterilized sugar mash, containing corn gluten, a culture of bacteria which are derivable from ordinary corn meal, are sufficiently heat resistant to withstand a temperature of 80° C. for about twenty minutes, and are capable of producing butyl alcohol and acetone by fermentation, in the presence of air, of a sterilized corn meal solution, said addition being made with the bacteria mainly in the spore form and while the sterilized sugar mash is at a temperature of from about 57 to 77° C., and then cooling the inoculated mash at a temperature between 30 and 40° C. to bring about active fermentation thereof.

4. The process which comprises adding to a sterilized sugar mash a culture of bacteria which are derivable from ordinary corn meal, are sufficiently heat resistant to withstand a temperature of 80° C. for about twenty minutes, and are capable of producing butyl alcohol and acetone by fermentation, in the presence of air, of a sterilized corn meal solution, said addition being made with the bacteria mainly in the spore form and while the sterilized sugar mash is at a pasteurization temperature, and then cooling the inoculated mash to a temperature at which vigorous fermentation will occur.

5. The process which comprises adding to a sterilized mash of a carbohydrate material other than corn meal, but containing corn protein, a culture of bacteria which are derivable from ordinary corn meal, are sufficiently heat resistant to withstand a temperature of 80° C. for about twenty minutes, and are capable of producing butyl alcohol and acetone by fermentation, in the presence of air, of a sterilized corn meal solution, said addition being made with the bacteria mainly in the spore form while the sterilized mash is at a pasteurization temperature, and then cooling the inoculated mash to a temperature at which vigorous fermentation will occur.

6. The process which comprises adding to a sterilized sugar mash a culture of bacteria which are derivable from ordinary corn meal, are sufficiently heat resistant to withstand a temperature of 80° C. for about twenty minutes, and are capable of producing butyl alcohol and acetone by fermentation, in the presence of air, of a sterilized corn meal solution, said addition being made with the bacteria mainly in the spore form and while the sterilized sugar mash is at a temperature of about 63° C., and then cooling the inoculated mash to a temperature between 30 and 40° C., to bring about active fermentation thereof.

7. The process which comprises adding a culture of the hereinbefore described Bacillus Aceto-butylicum to a sterilized sugar mash, said addition being made with the bacteria mainly in the spore form and while the sterilized sugar mash is at a temperature of from about 57 to 77° C., and then cooling the inoculated mash to a temperature between 30 and 40° C. to bring about active fermentation thereof.

8. The process which comprises adding a culture of the hereinbefore described Bacillus Aceto-butylicum to a sterilized sugar mash containing a vegetable protein readily assimilated by said bacillus, said addition being made with the bacteria mainly in the spore form and while the sterilized sugar mash is at a temperature of from about 57 to 77° C., and then cooling the inoculated mash to a temperature between 30 and 40° C. to bring about active fermentation thereof.

9. The process which comprises adding a culture of the hereinbefore described Bacillus Aceto-butylicum to a sterilized sugar mash containing corn gluten, said addition being made with the bacteria mainly in the spore form and while the sterilized sugar mash is at a pasteurization temperature, and then cooling the inoculated mash to a temperature at which vigorous fermentation will occur.

10. The process which comprises adding a culture of the hereinbefore described Bacillus Aceto-butylicum to a sterilized sugar mash containing corn gluten, said addition being made with the bacteria mainly in the spore form and while the sterilized sugar mash is at a temperature of from about 57 to 77° C., and then cooling the inoculated mash to a temperature between 30 and 40° C. to bring about active fermentation thereof.

11. The process which comprises adding a culture of the hereinbefore described Bacillus Aceto-butylicum to a sterilized mash of a fermentable carbohydrate, said addition being made with the bacteria mainly in the spore form and while the sterilized mash is at a pasteurization temperature, and then cooling the inoculated mash to a temperature at which vigorous fermentation will occur.

12. The process which comprises adding a culture of the hereinbefore described Bacillus Aceto-butylicum to a sterilized mash of a fermentable carbohydrate material other than corn meal, but containing corn protein, said addition being made with the bacteria mainly in the spore form and while the sterilized mash is at a temperature of from about 57 to 77° C., and then cooling the inoculated mash to a temperature between 30 and 40° C. to bring about active fermentation thereof.

13. The process which comprises adding a culture of the hereinbefore described Bacillus Aceto-butylicum to a sterilized mash composed principally of black strap molasses, said addition being made with the bacteria mainly in the spore form and while the sterilized mash is at a temperature between 57 and 77° C., and subsequently cooling the inoculated mash to a temperature at which vigorous fermentation will occur.

14. The process which comprises adding a culture of the hereinbefore described Bacillus Aceto-butylicum to a sterilized mash composed principally of black strap molasses and a small proportion of corn protein, said addition being made with the bacteria mainly in the spore form and while the sterilized mash is at a temperature between 57 and 77° C., and subsequently cooling the inoculated mash to a temperature at which vigorous fermentation will occur.

15. The process which comprises adding a culture of the hereinbefore described Bacillus Aceto-butylicum to a sterilized mash composed principally of black strap molasses, said addition being made with the bacteria mainly in the spore form and while the sterilized mash is at a temperature of about 63° C., and subsequently cooling the inoculated mash to a temperature at which vigorous fermentation will occur.

16. The process which comprises adding a culture of the hereinbefore described Bacillus Aceto-butylicum to a sterilized mash composed principally of black strap molasses and a small proportion of a vegetable protein, said addition being made with the bacteria mainly in the spore form and while the sterilized mash is at a temperature between 57 and 77° C., and subsequently cooling the inoculated mash to, and maintaining it at, a temperature between 35 and 38° C.

17. The process which comprises adding a culture of the hereinbefore described Bacillus Aceto-butylicum to a sterilized mash composed principally of black strap molasses, said addition being made with the bacteria mainly in the spore form and while the sterilized mash is at a temperature between 57 and 77° C., maintaining the mash at this temperature for a period of from about 10 to 25 minutes, and subsequently cooling the inoculated mash to a temperature at which vigorous fermentation will occur.

18. The process which comprises adding a culture of the hereinbefore described Bacillus Aceto-butylicum to a sterilized mash containing about 4% of fermentable sugar, said addition being made with the bacteria mainly in the spore form and while the sterilized sugar mash is at a temperature of from about 57 to 77° C., and then cooling the inoculated mash to a temperature between 30 and 40° C. to bring about active fermentation thereof.

19. The process which comprises adding a culture of the hereinbefore described Bacillus Aceto-butylicum to a sterilized mash containing about 4% of fermentable sugar and a smaller percentage of corn protein, said addition being made with the bacteria mainly in the spore form and while the sterilized sugar mash is at a temperature of from about 57 to 77° C., and then cooling the inoculated mash to a temperature between 30 and 40° C. to bring about active fermentation thereof.

20. In the process of fermenting a sterilized mash of a fermentable carbohydrate with bacteria capable of producing butyl alcohol and acetone, the step which comprises inoculating the final mash with said bacteria while the latter are mainly in the spore form.

21. In the process of fermenting a sterilized mash of a fermentable carbohydrate with the hereinbefore described Bacillus Aceto-butylicum, the step which comprises inoculating said mash with said bacteria while the latter are mainly in the spore form.

22. In the process of fermenting a sterilized mash containing a fermentable sugar and a vegetable protein with bacteria capable of producing butyl alcohol, the step which comprises inoculating said mash with said bacteria while the latter are mainly in the spore form.

23. In the process of fermenting a sterilized mash containing a fermentable sugar and a vegetable protein with the hereinbefore described Bacillus Aceto-butylicum, the step which comprises inoculating said mash with said bacteria while the latter are mainly in the spore form.

24. In the process of fermenting a sterilized mash of molasses with bacteria capable of producing butyl alcohol, the step which comprises inoculating said mash with said bacteria while the latter are mainly in the spore form.

25. In the process of fermenting a sterilized mash containing 4½% of invert sugar with the hereinbefore described Bacillus Aceto-butylicum, the step which comprises inoculating said mash with said bacteria while the latter are mainly in the spore form.

26. In the process of fermenting a sterilized mash containing a fermentable sugar and a vegetable protein with bacteria capable of producing butyl alcohol, the step which comprises inoculating said mash at a temperature between 57 and 77° C. with said bacteria while the latter are mainly in the spore form.

27. In the process of fermenting a molasses mash, the step which comprises subjecting to sterilization a solution containing substantially more than 10% and up to about 50% of molasses.

28. In the process of fermenting a molasses mash, the step which comprises subjecting to sterilization a solution containing about 50% of molasses.

29. In the process of fermenting a sterilized mash of a fermentable carbohydrate with a culture capable of producing butyl alcohol and acetone, the step which comprises inoculating the final mash with said organism or combination of organisms while said organisms are mainly in the spore form.

30. In the process of fermenting a sterilized mash of molasses with a culture capable of producing butyl alcohol and acetone, the step which comprises inoculating said mash with said organism or combination of organisms while said organisms are mainly in the spore form.

31. In the process of fermenting an imperfectly sterilized mash of a fermentable carbohydrate with bacteria capable of producing butyl alcohol and acetone, with step which comprises inoculating the final mash with a seed culture containing a dominating proportion of such bacteria while the said bacteria are mainly in spore form.

32. A process of preparing a fermentation mash containing a fermentable carbohydrate containing competitive micro organisms, and a dominating proportion of bacteria capable of producing butyl alcohol and acetone, which comprises preparing a seed culture containing a high proportion of such bacteria; bringing the seed culture to active fermentation; continuing the fermentation until the surviving bacteria revert mainly to the spore form; and using the seed culture so prepared to inoculate a sterilized final mash containing a fermentable carbohydrate.

33. In the process of fermenting an imperfectly sterilized mash of a fermentable carbohydrate with an organism, or a symbiotic combination of organisms, capable of producing butyl alcohol and acetone, the step which comprises inoculating the final mash with a seed culture containing a dominating proportion of such organism, or symbiotic combination of organisms, while the said organisms are mainly in the spore form.

34. In the process of fermenting an imperfectly sterilized mash of a fermentable carbohydrate with an organism, or a symbiotic combination of organisms, capable of producing butyl alcohol and acetone, the step which comprises inoculating the final mash while it is at a pasteurization temperature with a seed culture containing a dominating proportion of such organism, or symbiotic combination of organisms, while said organisms are mainly in the spore form.

In testimony whereof I affix my signature.

FOREST J. FUNK.

CERTIFICATE OF CORRECTION.

Patent No. 1,822,139.                              Granted September 8, 1931, to

FOREST J. FUNK.

It is hereby certified that error appears in the printed specification of the above numbered patent requiring correction as follows: Page 3, line 90, for "are" read after; page 7, line 31, claim 31, for "with" read the; and that the said Letters Patent should be read with these corrections therein that the same may conform to the record of the case in the Patent Office.

Signed and sealed this 3rd day of November, A. D. 1931.

(Seal)

M. J. Moore,
Acting Commissioner of Patents.